United States Patent [19]

Block

[11] 4,240,924

[45] Dec. 23, 1980

[54] COMPOSITIONS CAPABLE OF FORMING AQUEOUS SYSTEMS HAVING PSEUDOPLASTIC PROPERTIES

[75] Inventor: Jacob Block, Rockville, Md.

[73] Assignee: W. R. Grace & Co., New York, N.Y.

[21] Appl. No.: 22,784

[22] Filed: Mar. 22, 1979

[51] Int. Cl.$^3$ .......................... C09K 7/04; B01J 13/00
[52] U.S. Cl. ................................ 252/317; 252/8.5 B
[58] Field of Search .............. 252/8.5 B, 8.5 A, 8.5 R, 252/317, 463

[56] References Cited

U.S. PATENT DOCUMENTS

| | | | |
|---|---|---|---|
| 2,085,129 | 6/1937 | Stoewener | 252/317 |
| 3,105,053 | 9/1963 | Cramer et al. | 252/317 X |
| 3,852,201 | 12/1974 | Jackson | 252/8.5 |
| 3,860,070 | 1/1975 | Herce et al. | 166/308 X |
| 3,988,246 | 10/1976 | Hartfiel | 252/8.5 |
| 3,997,452 | 12/1976 | Richardson et al. | 252/8.5 |

*Primary Examiner*—Herbert B. Guynn
*Attorney, Agent, or Firm*—Howard J. Troffkin; William W. McDowell, Jr.

[57] ABSTRACT

Stable and storable solid compositions which are capable of readily dispersing in an aqueous medium and causing the formed aqueous system to exhibit a high degree of pseudoplasticity. The solid composition comprises a mixture of particulate alkali metal aluminate and a solid, water soluble zinc, iron or aluminum metal salt of an inorganic mineral acid selected from halogen or nitric acid. The aluminate and metal salt should be present in a ratio such that the composition is capable of forming an aqueous system having an alkaline pH of at least 8.

10 Claims, No Drawings

COMPOSITIONS CAPABLE OF FORMING AQUEOUS SYSTEMS HAVING PSEUDOPLASTIC PROPERTIES

BACKGROUND OF THE INVENTION

The present invention is directed to dry, stable, storable compositions which are capable of readily dispersing in water and causing the resultant aqueous system to exhibit a high degree of pseudoplastic properties. Such compositions are useful for on-site formation of improved water-based drilling fluids as well as imparting pseudoplasticity to other water-based systems.

Various compositions have been used to impart viscosity to the aqueous system. These materials include organic materials as, for example, xanthan gums such as described in U.S. Pat. Nos. 3,198,268; 3,208,526; 3,251,147; 3,243,000; 3,307,016 and 3,319,715. Although such materials can be formed into a dry product suitable for shipment, readily disperse in water to produce an aqueous system having good pseudoplastic properties at varying low shear rates, these materials have the distinct drawback of being expensive to produce and being unstable when subjected to elevated temperatures.

Aluminum containing compositions have been used to form aqueous gels or cements. For example, U.S. Pat. No. 1,871,781 discloses that when the aluminum salt of the organic acid, acetic acid, is combined with hydrated lime they form a cement composition having good waterproofing properties. U.S. Pat. No. 3,395,221 is directed to the formation of hydrous aluminum oxide gels by separately introducing an aluminum cloride or sulfate, and an alkali metal hydroxide, such as sodium hydroxide, into an aqueous solution. U.S. Pat. No. 3,815,681 discusses aqueous solutions containing an aluminum salt with a time delay pH increasing reactant such as ammonium carbamates, carbamic acid, or halide salts of cyanic acid. Such systems eventually form rigid, immobile gels capable of plugging voids in subterranean earth formations. U.S. Pat. No. 3,860,070 discloses aqueous compositions containing a water soluble amphoteric metal salt and a small quantity of a water soluble base in a ratio such that the aqueous composition has an acidic pH of about 2 to 3. This patent teaches that at such a ratio and resultant pH composition exhibits a high degree of desired properties.

Each of the above aqueous systems are unsuitable for the presently intended purpose of providing a dry, stable composition which is readily dispersible in water and causes the water to exhibit pseudoplastic properties over a wide range of varying low shear rates.

Compositions which are suitable for the intended purpose must be stable under storage conditions and must be readily dispersible in aqueous medium. The ability to readily disperse and form a pseudoplastic system is critical in the area of oil well drilling fluids. Field conditions do not permit the utilization of elaborate equipment nor the luxury of long periods of time to form the desired aqueous fluid. The American Petroleum Institute Specification 13A is directed to a testing procedure to determine suitable materials for forming drilling fluids. Such a test has equivalent meaning in the case of formation of other aqueous systems.

The term "pseudoplastic" as used in the subject application and claims refers to aqueous systems which exhibit non-Newtonian properties, that is to say that the viscosity of the aqueous system varies inversely with respect to the shear rate imposed on the fluid. The relationship of the shear stress with respect to shear rate can be defined by the rheological power law model relationship of $$\tau = K(\dot{\gamma})^n$$

in which $\tau$ represents the shear stress exerted on the aqueous system of the drilling fluid in units such as pounds per 100 ft$^2$ or dynes/cm$^2$; $\dot{\gamma}$ is the shear rate in units of reciprocal time such as sec$^{-1}$; K is a constant having the value of the shear stress of the particular system at a shear rate of 1 sec$^{-1}$; and n is a numerical value of from 0 to 1 or more. Fluids which exhibit a high degree of non-Newtonian, pseudoplastic properties can be defined by the above power law model relationship wherein n has a numerical value of less than about 0.4. Compositions capable of imparting such properties to fluid systems, especially aqueous systems, are highly desired. Such aqueous systems when utilized as water-based drilling fluids cause substantial increase in the efficiency of a drilling operation.

SUMMARY OF THE INVENTION

The present invention is directed to a stable and storable composition capable of readily dispersing in an aqueous medium to form an aqueous system having desirable pseudoplastic properties. The composition is a dry, particulate, substantially homogeneous mixture of an alkali metal aluminate and a metal salt of nitric or halogenic acid; the metal of the salt being selected from zinc, iron or aluminum. The ratio of the components of the mixture is such that an aqueous system formed therewith has a pH of at least about 8.

DETAILED DESCRIPTION OF THE INVENTION

The composition of the present invention is formed from a mixture of dry, particulate components, the first component being an alkali metal aluminate formed from any alkali metal, such as, for example, sodium, potassium lithium or mixtures thereof with sodium or potassium being preferred. The alkali metal aluminates can have a mole ratio of alkali metal oxide to aluminum oxide of from about 1:1 to 2:1. Such aluminates are presently commercially available materials.

It has been unexpectedly found that a stable, storable composition can be formed if the aluminate used contains less than a certain amount of water associated therewith. The amount of water associated with the aluminate is directly related to the particle size of the material. The average particle size of 80 percent of the aluminate material being used is sufficient to determine the maximum water content acceptable in forming compositions of the present invention. For example, particulate alkali metal aluminate capable of passing through a 40 mesh (U.S. Standard) sieve can have a maximum water content of about 8 percent by weight while particulate material capable of passing through 20 or 10 mesh sieve can have water contents of 10 and 18 percent, respectively. It is preferred that the aluminate, irrespective of particle size, contain less than 10 percent, and preferably less than 8 percent, water. Commercially available alkali metal aluminate can be dried to the required degree by any convenient method such as by air heating a preformed aluminate at a temperature of about 100° to 212° F. for a sufficient period of time. Higher temperatures, up to about 250° F., and longer periods of heating time as well as vacuum heating can be used in well-known manners to further decrease the amount of water associated with the alkali metal aluminate composition of the present invention.

The composition of the present invention further requires a solid, particulate, water soluble metal salt of an inorganic acid as a necessary component; the metal being selected from zinc, iron or aluminum. The salt can be anhydrous or have bound water of hydration associated with it. The inorganic acid salts required by the present invention are salts of nitric acid or halogenic acid, such as hydrochloric, hydrobromic and the like acids, with hydrochloric being preferred. The metals preferred in forming the present salt component are aluminum or iron. Examples of such salts include aluminum chloride, aluminum chloride hexahydrate, aluminum bromide, aluminum bromide hexahydrate, aluminum nitrate nonahydrate, ferrous chloride, ferrous chloride dihydrate and tetrahydrate, ferrous bromide, ferric chloride, ferric chloride hexahydrate, ferric bromide, ferric bromide hexahydrate, ferrous nitrate hexahydrate, ferric nitrate hexahydrate, ferric nitrate nonahydrate, zinc chloride, zinc bromide, zinc nitrate trihydrate, zinc nitrate hexahydrate and the like. The preferred metal salts are the nitrate and chloride salts of aluminum or iron and most preferred are these salts in their hydrate form. It has been unexpectedly found that only the salts of a halide acid or of nitric acid form the composition of the present invention, which are storage stable, readily dispersible and capable of producing pseudoplastic aqueous systems in accordance with industrial recognized requirements.

The particle size of the metal salt component described hereinbelow is not critical, although it is desirable that such salts be of substantially the same particle size distribution as is required for the alkali metal aluminate. Further, if an aluminate of a particular range of mesh size is used it is preferred that the metal salt be of substantially the same mesh size to aid in the maintenance of a uniform mix of the components during storage and the like. A particle size of about 40 mesh or larger for at least 80 percent of such material is preferred.

The alkali metal aluminate and the metal salt of the inorganic acids indicated hereinabove should be used in a weight ratio such that when the mixture is placed in water it forms an aqueous system which has a pH of from at least 8 to about 11, and preferably the ratio of components should be such that the pH of the resultant aqueous system is from 9 to 10.5. The mole ratio of alkali metal aluminate to metal salt is normally from 1.05:1 to 1.2:1. The specific amount of alkali metal aluminate and metal salt to be used depends on the particular components used, the amount of water associated with the particular component, as discussed hereinabove, etc. The required amount can be readily determined by those skilled in this art using conventional testing procedures. It has been unexpectedly found that the subject compositions having the above required ratio of components are capable of readily dispersing in an aqueous medium to produce an aqueous system which exhibits the desired pseudoplastic, non-Newtonian properties.

Although the ratio of the components is such as to form an aqueous system having the desired rheological properties, fine adjustments within the above-stated range can be made, if desired, by the utilization of small amounts of an inorganic acid or base. The acid should be the free acid of nitric or halogen acid. The base should be an alkali metal oxide or hydroxide.

The composition of the subject invention is formed by mixing an alkali metal aluminate and a zinc, iron or aluminum metal salt or a mixture of salts in the required mole ratio as described above. The mixing can be done by any conventional method for mixing solid, particulate materials.

Materials which are deemed satisfactory as a component of a drilling fluid in bore hole drilling operations are required to be readily dispersible in water and to impart desirable pseudoplasticity and viscosity to the resultant system. Both fresh and salt water are used in drilling operations according to the availability and, therefore, desirable compositions must be compatible and dispersible in both systems. Further, because of the limitations of equipment normally found at drill sites and the large amount of fluid normally required, it is imperative that the materials be capable of readily dispersing in an aqueous medium. The American Petroleum Institute has promulgated Specification 13A, which stipulates certain specifications and tests for determining materials which can be dispersed using conventional equipment found at the drill site. The compositions of the present invention are capable of meeting the requirements of API specification 13A.

Various additional materials which are inert with respect to pseudoplasticity can be incorporated into the subject composition such as conventional pigments, drying agents and the like. The exact material, amount and the nature of the material can be readily determined by conventional means by those skilled in the art, and will depend on the specific end use of the aqueous system formed with the present composition.

The following examples are given for illustrative purposes only and are not meant to be a limitation on the subject invention except as indicated by the claims appended hereto. All parts and percentages are by weight unless otherwise indicated. The units of K throughout the examples are lb-sec/100 ft$^2$.

EXAMPLE I

A composition was formed from sodium aluminate ($Na_2O:Al_2O_3$ mole ratio=1.2:1) which had a water content of about 17 percent by weight and from aluminum chloride hexahydrate. The aluminate was composed of at least 80 percent particulate materials of a mesh ranging from about 6 to 12 (U.S. Standard). The materials were inserted in a vessel and roll mixed until substantial uniform distribution was attained. The composition was found to be stable over a sustained period by observing no thermal rise.

The dispersability of the formed composition was tested in accordance with the test procedure of API Specification 13A. A mixer capable of 11,000 rpm±300 rpm under load and having a single corrugated impeller of approximately 2.5 cm diameter was used. 7.3 Parts of the composition was introduced into 92.7 parts deionized water while stirring. Stirring was continued for 20 minutes. The formed aqueous system (Sample 1) was stored for approximately 16 hours in a sealed container at room temperature. It was observed to be a uniform dispersion before and after storage. The aqueous system was stirred for 5 minutes in accordance with Specification 13A and then underwent rheology testing.

The rheological properties of the formed aqueous system was determined using standard procedures with a Haake Rotovisco RV-1 rotating viscometer at varying low shear rates of from 8 to 1300 sec$^{-1}$ and at 25° C. A plot of log shear stress values versus log shear rate values was made to determine if the formed aqueous system exhibited a straight line relationship, the extent of such a relationship, the degree of pseudoplastic, non-Newtonian properties (as shown by the value of n) and to extrapolate and determine shear stress at shear rate of one sec$^{-1}$ (value of K and indication of viscosity of system).

The sample was adjusted to a pH of 9.6 using a small amount of NaOH. The results are given in Table I below.

EXAMPLE II

A sample of the composition formed in Example I above was used to form an aqueous system (Sample 2) in the same manner as described above except that salt (3.5% NaCl) water was used.

An additional sample was taken from the dry, particulate composition of Example I and formed into an aqueous system (Sample 3) using artificial sea water. This sea water was formed in accordance with the teachings of H. U. Sverdrup et al in *The Oceans*, page 186, and contained 106 parts NaCl, 20.9 parts MgCl$_2$.6 H$_2$O, 13.2 parts MgSO$_4$, 6.1 parts CaCl$_2$.2 H$_2$O, 2.9 parts KCl, 0.8 part NaHCO$_3$, 0.3 part NaBr and 3849.8 parts D.I. water.

Each of the aqueous systems formed with the subject composition was tested for rheological properties in the manner described in Example I above. The results are summarized in Table I below.

TABLE I

| Sample | Water | pH | Adj pH | n | K |
|---|---|---|---|---|---|
| 1 | Distilled | 8.7 | 9.6 | 0.20 | 6.6 |
| 2 | Salt | 8.7 | 9.6 | 0.18 | 6.9 |
| 3 | Art. Sea | 8.5 | 9.6 | 0.25 | 6.0 |

All samples exhibited a straight line relationship over the entire range of shear rates tested. The results show that the composition is stable and capable of forming a highly pseudoplastic aqueous system.

EXAMPLE III

A composition was formed in the same manner as described in Example I above except that an equivalent amount of Al(NO$_3$)$_3$.9 H$_2$O was substituted for AlCl$_3$.

The solid, particulate composition was observed to be storage stable at room temperature and readily dispersed in accordance with API Specification 13A in artificial sea water. The resultant aqueous system (7.3% solids) had a pH of 8.6. The pH was adjusted to 9.6 with sodium hydroxide and the rheological properties were tested in the manner described in Example I above. The composition caused the aqueous system to be non-Newtonian, pseudoplastic over the entire test range and was found to have n and K values of 0.3 and 3.2 respectively. The dry composition was observed to be stable at ambient conditions over a sustained period.

EXAMPLE IV

Comparative compositions were formed in the same manner as in Example I above except that the aluminum chloride was substituted by equivalent amounts of aluminum sulfate and by potassium aluminum sulfate. Each of the compositions gave poor dispersability and rheological results. The pH of the formed aqueous system was 9.0 and 9.1, respectively. The n and K values of the resultant fluids (pH adjusted to 9.6) were determined in the manner described above and were 1 and less than 0.1 for the potassium aluminum sulfate formed aqueous system and 0.85 and less than 0.1 for the aluminum sulfate formed aqueous system. These fluids were Newtonian.

Each of the above compositions was unsatisfactory.

EXAMPLE V

A composition was formed in the same manner as described in Example I above except that the sodium aluminate was air dried at 212° F. to reduce the water content to 7%. Samples of the composition were dispersed in the Example I above-described artificial sea water to a concentration of 7.3 percent total solid composition. The composition was found to readily disperse in accordance to API Specification 13A, to cause the sea water to form a pseudoplastic fluid and to be stable and capable of forming a pseudoplastic fluid after ambient temperature storage. The n and K values are given below.

| Room Temperature Storage | | |
|---|---|---|
| Days | n | K |
| 0 | 0.18 | 7.4 |
| 8 | 0.17 | 9.4 |

EXAMPLE VI

Compositions were formed in the same manner as described in Example I above except that the aluminate was separated into particles of various size ranges. Further, compositions were formed from air dried aluminate having a resultant water content of 7% by weight. The air dried aluminate was separated into particle size ranges. Each of the compositions was tested for dispersibility in artificial sea water as described in Example II above according to API Specification 13A, for capability of causing the sea water to exhibit pseudoplastic properties, and for storage stability. The stability of the compositions was determined by their ability (or lack thereof) to form pseudoplastic aqueous systems after ambient temperature storage.

The results are given in Table II below:

TABLE II

| Particle Size (mesh) | Storage Days | sodium aluminate/AlCl$_3$ | | | |
|---|---|---|---|---|---|
| | | n for 17% H$_2$O | k for 17% H$_2$O | n 7% H$_2$O | k 7% H$_2$O |
| 6–16 | 0 | 0.3 | 4.5 | 0.18 | 7.4 |
| " | 4 | 0.2 | 6.3 | — | — |
| " | 8 | — | — | 0.16 | 6.2 |
| " | 21 | 0.2 | 4.1 | — | — |
| 16–20 | 0 | 0.3 | 3.3 | 0.18 | 7.4 |
| " | 4 | 0.27 | 1.7 | — | — |
| " | 8 | — | — | 0.14 | 5.4 |
| " | 21 | 0.2 | 2.7 | — | — |
| 20–40 | 0 | 0.3 | 5.4 | 0.18 | 7.4 |
| " | 4 | 0.6 | 0.2 | — | — |
| " | 8 | — | — | 0.17 | 3.9 |
| " | 21 | 1.0 | <0.1 | — | — |
| <40 | 0 | 0.3 | 2.1 | 0.18 | 7.4 |
| " | 4 | 0.3 | 1.7 | — | — |
| " | 8 | 0.7 | <0.1 | 0.17 | 3.6 |

The results show that compositions formed from aluminate material of a larger particle size range can have higher water content associated therewith than the smaller particle material. Further, the results show that a still higher degree of pseudoplasticity (lower n value) can be imparted to aqueous systems using compositions formed from dried aluminate material.

EXAMPLE VII

Compositions were formed in the manner described in Example I except that equivalent amounts of ferric chloride hexahydrate and anhydrous ferric chloride, respectively, were used instead of aluminum chloride. The compositions were observed to be stable, have a good shelf life, be capable of readily dispersing in an aqueous media in accordance with API Specification 13A and to impart pseudoplastic properties to the aqueous media. The n and K values for the formed fluids were:

| Sample | Days | n | K |
| --- | --- | --- | --- |
| $FeCl_3 \cdot 6 H_2O$ | 0 | 0.12 | 6.3 |
| $FeCl_3 \cdot 6 H_2O$ | 13 | 0.14 | 5.4 |
| $FeCl_3$ | 0 | 0.17 | 7.4 |
| $FeCl_3$ | 13 | 0.17 | 3.6 |

EXAMPLE VIII

For comparative purposes, a composition was formed as described in Example I above except that the ratio of sodium aluminate to aluminum chloride was such that an aqueous system formed with this material had an acidic pH of 5.0. The aqueous system (7.3% solids of composition) did not exhibit pseudoplastic properties but was, instead, Newtonian (n=1, K=<0.1).

While the invention has been described in connection with certain preferred embodiments, it is not intended to limit the invention to the particular forms set forth, but, on the contrary, it is intended to cover such alternatives, modifications and equivalents as defined by the appended claims.

I claim:

1. A stable, storable, solid particulate composition capable of dispersing in an aqueous system and causing said aqueous system to exhibit a high degree of pseudoplastic properties consisting essentially of a mixture of a solid, particulate alkali metal aluminate having up to about 10 percent by weight of water associated therewith and a solid, particulate, water soluble inorganic halide or nitrate salt of a metal selected from the group consisting of zinc, iron, aluminum or mixtures thereof, the ratio of alkali metal aluminate to metal salt being sufficient to cause an aqueous system containing said mixture to have an alkaline pH of from at least 8 to 11.

2. The composition of claim 1, wherein the alkali metal aluminate has a molar ratio of alkali metal oxide to aluminum oxide of from 1:1 to 2:1.

3. The composition of claim 2 wherein the inorganic salt is of a metal selected from the group consisting of iron or aluminum.

4. The composition of claim 2 or claim 3, wherein the ratio of alkali metal aluminate to metal salt is sufficient to cause an aqueous system to have a pH of from about 9 to 10.5.

5. The composition of claim 2, wherein the alkali metal aluminate is sodium aluminate; the metal salt is selected from the group consisting of aluminum halide, aluminum nitrate, iron halide, iron nitrate or their hydrates; the ratio being such that an aqueous system of said mixture has a pH of from about 9 to 10.5.

6. The composition of claim 3, wherein the metal is iron.

7. The composition of claim 3, wherein the metal is aluminum.

8. The composition of claim 4, wherein the mole ratio of alkali metal aluminate to metal salt is from 1.05:1 to 1.2:1.

9. The composition of claim 4, wherein the alkali metal aluminate is a sodium aluminate.

10. The composition of claim 9, wherein the particle size of the sodium aluminate is smaller than about 40 mesh and the water content of the aluminate is up to about 8 percent.

* * * * *